United States Patent
Yu

(10) Patent No.: US 7,290,926 B2
(45) Date of Patent: Nov. 6, 2007

(54) THERMOMETER WITH MOVABLE COVER

(75) Inventor: Chu-Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 80 days.

(21) Appl. No.: 11/194,352

(22) Filed: Aug. 1, 2005

(65) Prior Publication Data

US 2006/0023767 A1    Feb. 2, 2006

(30) Foreign Application Priority Data

Aug. 2, 2004   (TW) ............................. 93212363 U
Sep. 10, 2004  (TW) ............................. 93214426 U

(51) Int. Cl.
*G01K 1/08* (2006.01)

(52) U.S. Cl. .................. 374/209; 374/158; 374/121; 600/474

(58) Field of Classification Search ............... 374/209, 374/158

See application file for complete search history.

(56) References Cited

U.S. PATENT DOCUMENTS

| | | | | |
|---|---|---|---|---|
| 4,863,281 A | * | 9/1989 | Suszynski | ................... 374/158 |
| 4,993,424 A | * | 2/1991 | Suszynski et al. | .......... 600/549 |
| 5,167,235 A | | 12/1992 | Seacord et al. | |
| 5,833,367 A | * | 11/1998 | Cheslock et al. | ........... 374/158 |
| 6,786,636 B1 | * | 9/2004 | Huang et al. | ................ 374/158 |

* cited by examiner

*Primary Examiner*—Diego Gutierrez
*Assistant Examiner*—Mirellys Jagan
(74) *Attorney, Agent, or Firm*—Thomas, Kayden, Horstemeyer & Risley

(57) ABSTRACT

An ear thermometer including a main body and a probe secured thereto for receiving heat radiation emitted from ear canal. A disposable sheath is operative to surround the probe and isolate the probe from contact with the ear canal. A non-detachable cap which is secured to the main body and the probe are movable relative to each other, thereby allowing the disposable sheath to be popped off of the probe by movement of the non-detachable cap or the probe.

4 Claims, 7 Drawing Sheets

THERMOMETER WITH MOVABLE COVER

BACKGROUND OF THE INVENTION

1. Field of the Invention

The invention relates to the field of thermometers. More particularly, the invention relates to the field of ear thermometers.

2. Description of the Related Art

Recently, it has been determined that tympanic membrane within human's ear canal is an excellent site for determination of the core temperature of a body due to its proximity to the external carotid artery which supplies blood to the hypothalamus. However, prior ear thermometers suffer from a problem that they require sterilization frequently when used with a number of patients to prevent cross-contamination.

SUMMARY OF THE INVENTION

Accordingly, an embodiment of the invention provides an ear thermometer, comprising: a main body, comprising a front end stop portion, a rear end stop portion, and a recess portion therebetween; a probe, secured to the main body, for receiving heat radiation emitted from ear canal; a disposable sheath, surrounding the probe and isolating the probe from contact with the ear canal; and a slidable cap, disposed on the recess portion, operative to pop the disposable sheath off of the probe by movement of the slidable cap toward the front end stop portion.

Another embodiment of the invention provides an ear thermometer for receiving heat radiation emitted from ear canal, comprising: a main body; a hollow cap with a chamber therein, secured to the main body; a rotary control, disposed between the main body and the hollow cap; a threaded sleeve with an inner thread, secured to the rotary control in the chamber; a probe with an outer thread engaging the inner thread, surrounded by the threaded sleeve; and a disposable sheath, surrounding the probe and isolating the probe from contact with the ear canal; wherein the probe is operative to be introduced into the chamber and the disposable sheath is popped off of the probe by rotating the rotary control in a first direction, and pushed out of the hollow cap by rotating the rotary control in a second direction.

Another embodiment of the invention provides an ear thermometer for receiving heat radiation emitted from ear canal, comprising: a main body; a probe, secured to the main body, for receiving heat radiation emitted from the ear canal; a disposable sheath, surrounding the probe and isolating the probe from contact with the ear canal; a non-detachable cap, secured to the main body, wherein the non-detachable cap and the probe are movable relative to each other, thereby allowing the disposable sheath to be popped off of the probe by movement of the non-detachable cap or the probe.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The invention provides a main body and a probe secured thereto for receiving heat radiation emitted from ear canal. A disposable sheath is operative to surround the probe and isolate the probe from contact with the ear canal. A non-detachable cap which is secured to the main body and the probe are movable relative to each other, thereby allowing the disposable sheath to be popped off of the probe by movement of the non-detachable cap or the probe.

Figure 1:
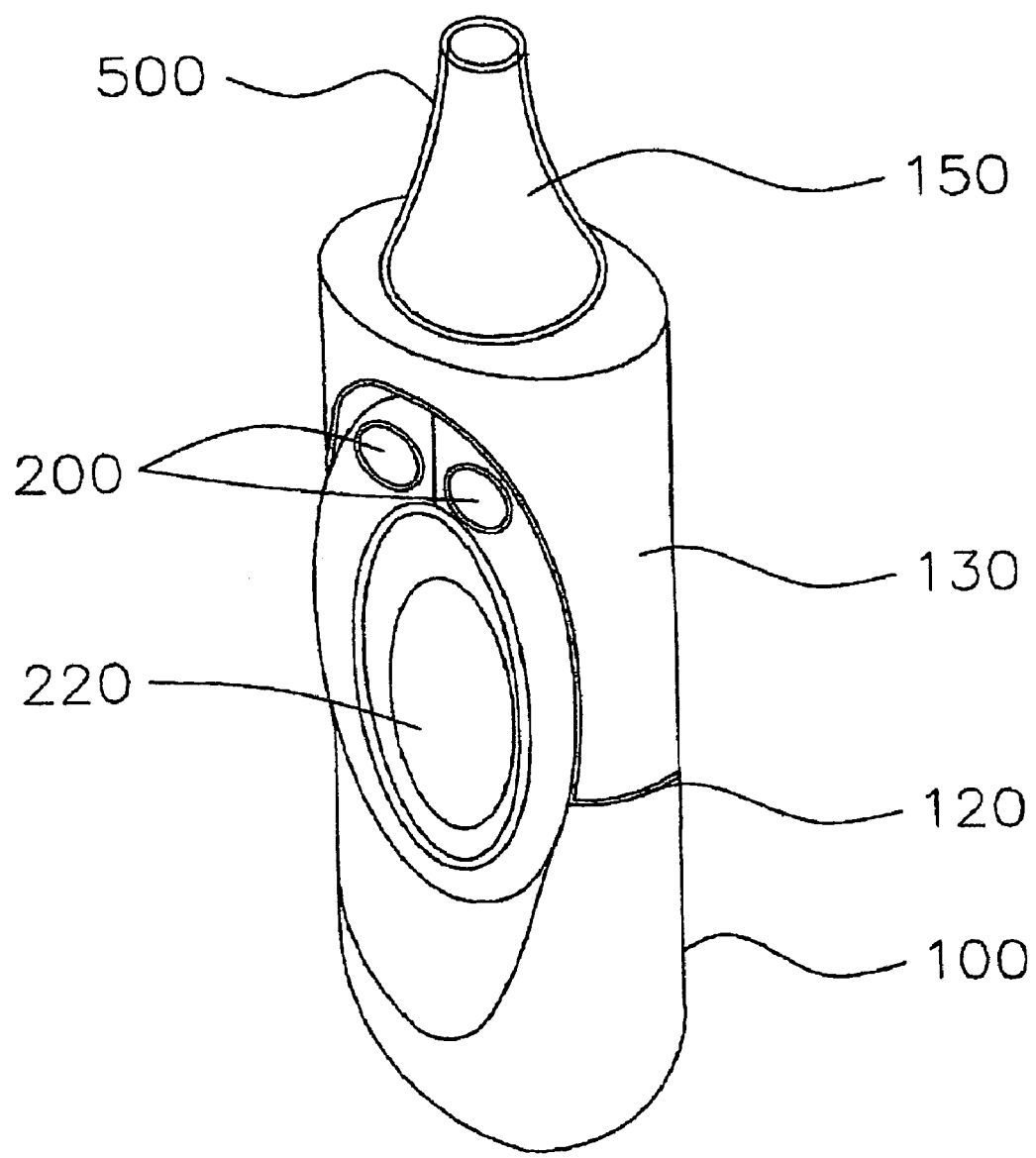
FIG. 1 is a perspective schematic diagram showing an ear thermometer of an embodiment.
Figure 2:
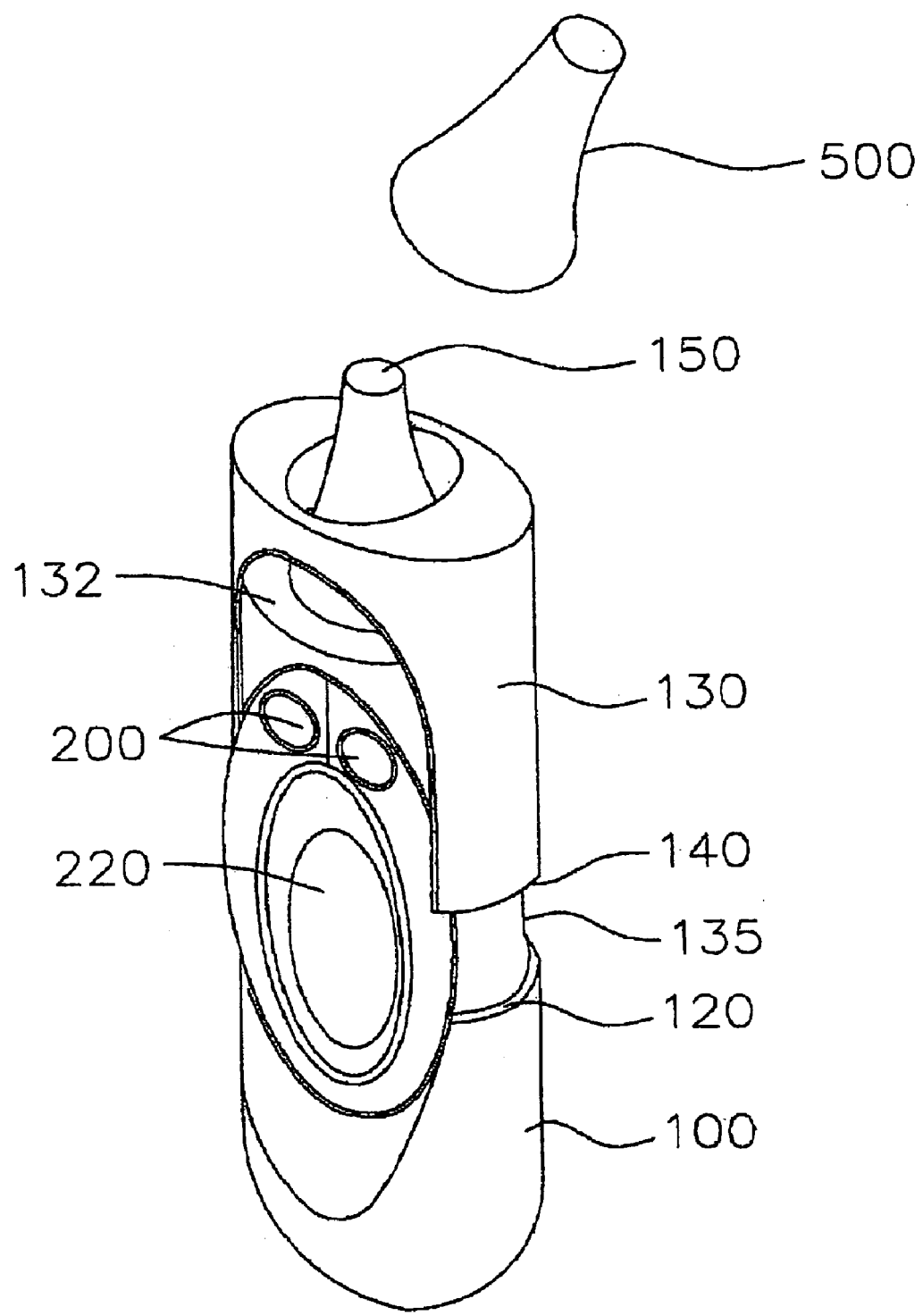
FIG. 2 is a perspective schematic diagram showing an ear thermometer of an embodiment after a probe has been surrounded by a slidable cap.

Referring to FIGS. 1 and 2, an ear thermometer of an embodiment is illustrated. The thermometer comprises a main body 100 and a probe 150 secured thereto. In general, the probe 150 is operative to receive heat radiation emitted from the ear canal. And the main body 100 may typically comprise a front end stop portion 140, a rear end stop portion 120, and a recess portion 135 therebetween.

Furthermore, a disposable sheath 500 may surround the probe and isolate the probe from contact with the ear canal. Typically, the disposable sheath 500 is configured to conform to the outer surface of probe 340.

Referring to FIG. 2, a slidable cap 130 is disposed on the recess portion 135, which may be operative to pop the disposable sheath 500 off of the probe 150 after use, by movement of the slidable cap 130 toward the front end stop portion 140. On the other hand, the slidable cap 130 may be operative to reveal the probe 150 for receiving heat radiation emitted from the ear canal, by movement of the slidable cap 130 toward the rear end stop portion 120. Therefore, patient's ear canal could keep clean and free of contaminants.

Preferably, the slidable cap 130 is stopped at the front end stop portion 140 or the rear end stop portion 120.

In one example, the ear thermometer may be an infrared thermometer. Generally, the probe 150 with a transparent window (not shown) has the geometry suitable for being disposed in a human ear. The heat radiation emitted from the human ear is transmitted into the sensor (not shown) installed in the probe via the transparent window. The technique for the probe is known to the art.

Also referring to FIG. 2, the slidable cap 130 may comprise an opening on its top surface, thereby allowing the probe 150 to pass through the opening. In addition, the top surface of the slidable cap 130 is operative to pop the disposable sheath 500 off of the probe 150.

In one example, an operating portion disposed on one side of the main body may comprise a liquid crystal display 220 and button switch 200. By switching on one of the buttons, the power supply is provided. By activating a measuring key, the temperature is measured and displayed on the liquid crystal display 220.

However, the slidable cap 130 may cover the operating portion when it is moved to the rear stop end portion 120. For exposing the operating portion of the main body 100, the slidable cap 130 may further comprise an opening 132 on its side surface.

Figure 3:
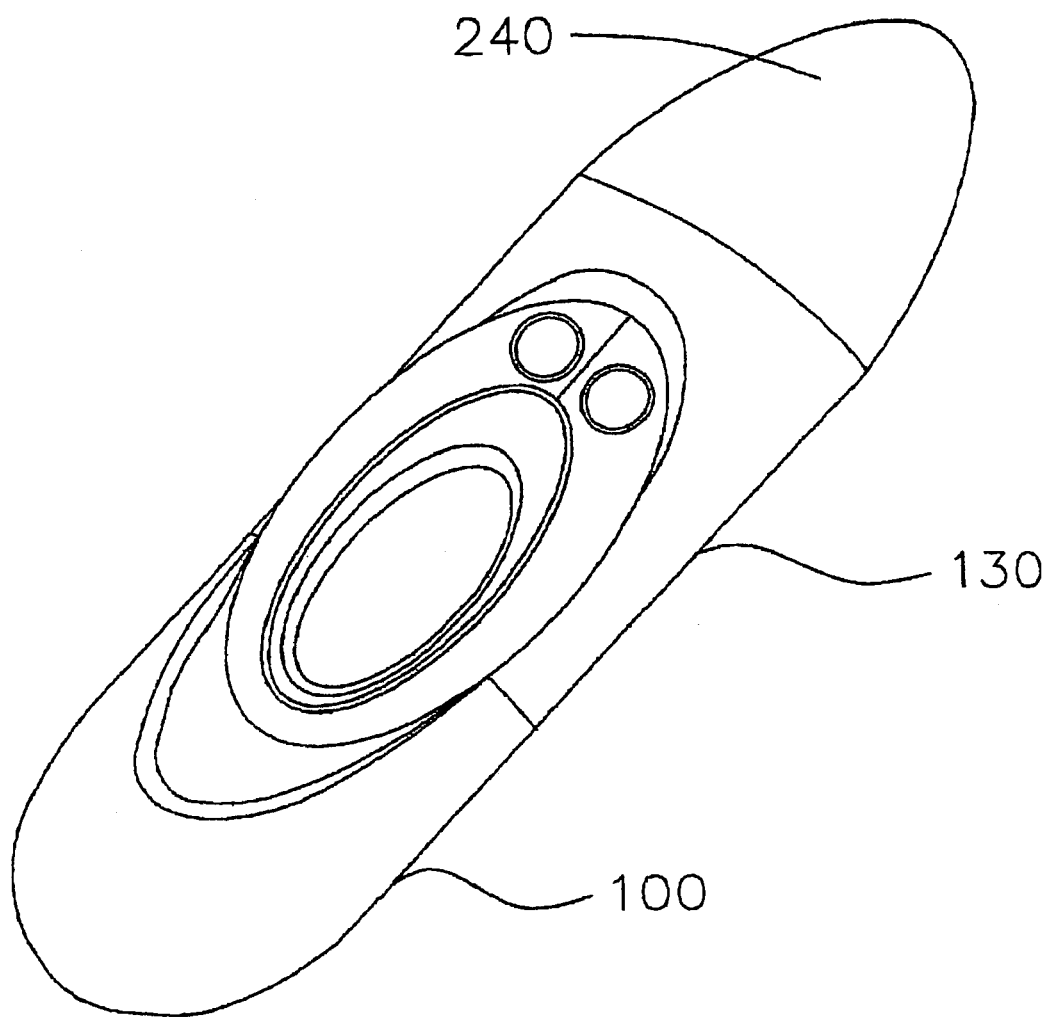
FIG. 3 is a perspective schematic diagram showing an ear thermometer of an, embodiment after a probe has been covered with a protective cover.
Figure 4:
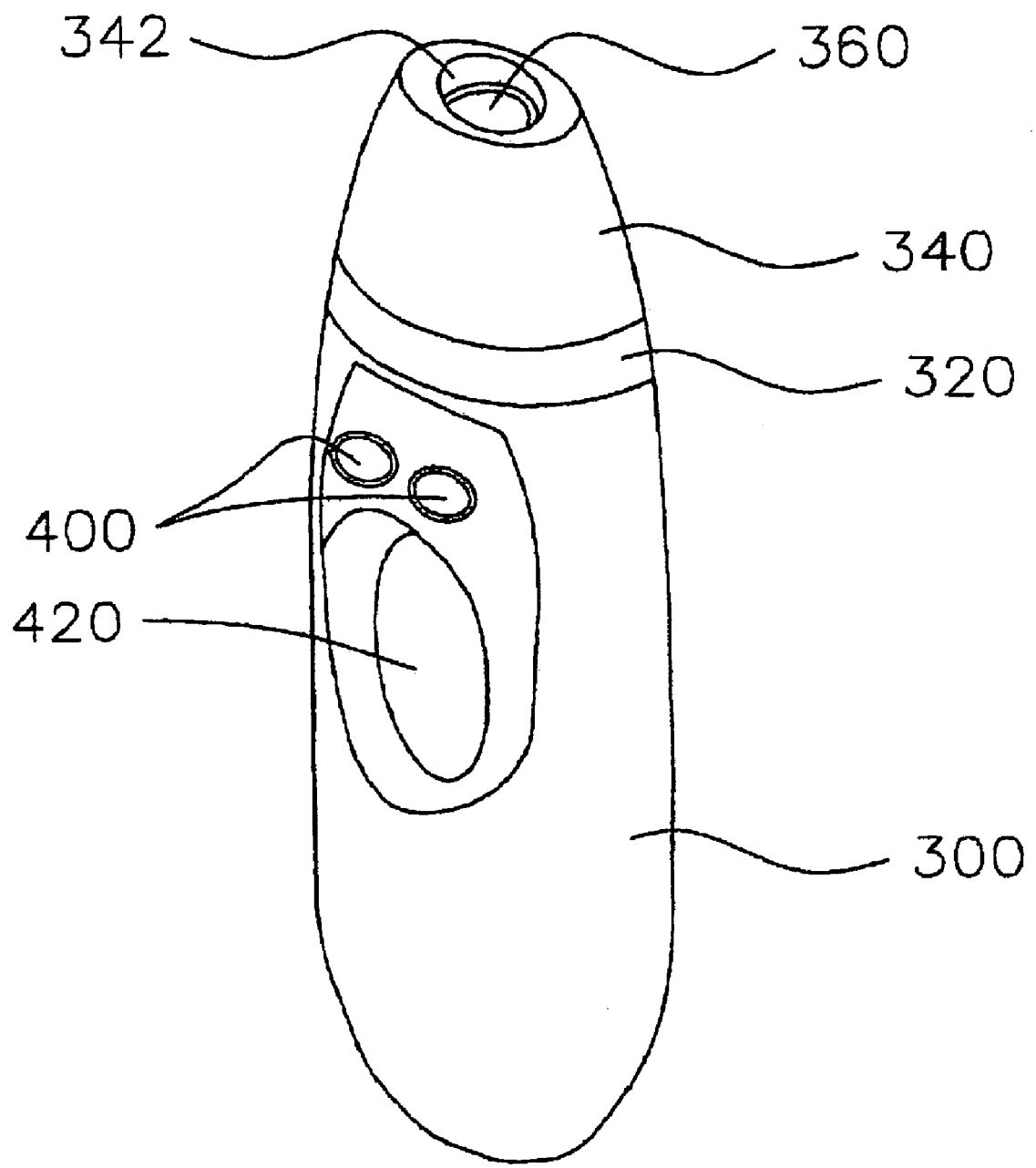
FIG. 4 is a perspective schematic diagram showing an ear thermometer of an embodiment.

Referring now to FIG. 3, the ear thermometer preferably comprises a protective cover 240 provided to cover the probe 150 when the slidable cap 130 is stopped at the rear end stop portion 120.

Referring to FIGS. 4, 5, 6 and 7, an ear thermometer of an embodiment is illustrated. The ear thermometer comprises a main body 300 and a probe 360 secured thereto. In general, the probe 360 is operative to receive heat radiation emitted from ear canal.

Alternatively, a hollow cap 340 with a chamber therein is secured to the main body 300, and a rotary control 320 is disposed between the main body 300 and the hollow cap 340.

Figure 7:
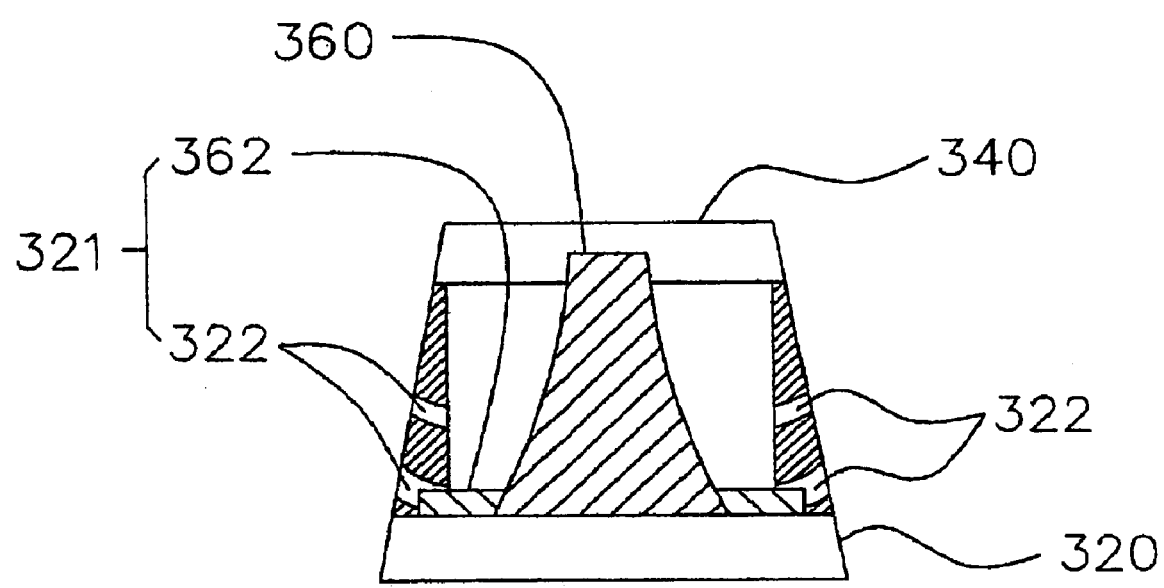
FIG. 7 is a cross-sectional view of an embodiment of a probe surrounded by a cap.

In addition, referring to FIG. 7, a threaded sleeve 321 with an inner thread 322 may be secured to the rotary control 320 in the chamber. On the other hand, the probe surrounded by the threaded sleeve 321 may comprise an outer thread 362 for engaging the inner thread 322.

Figure 5:
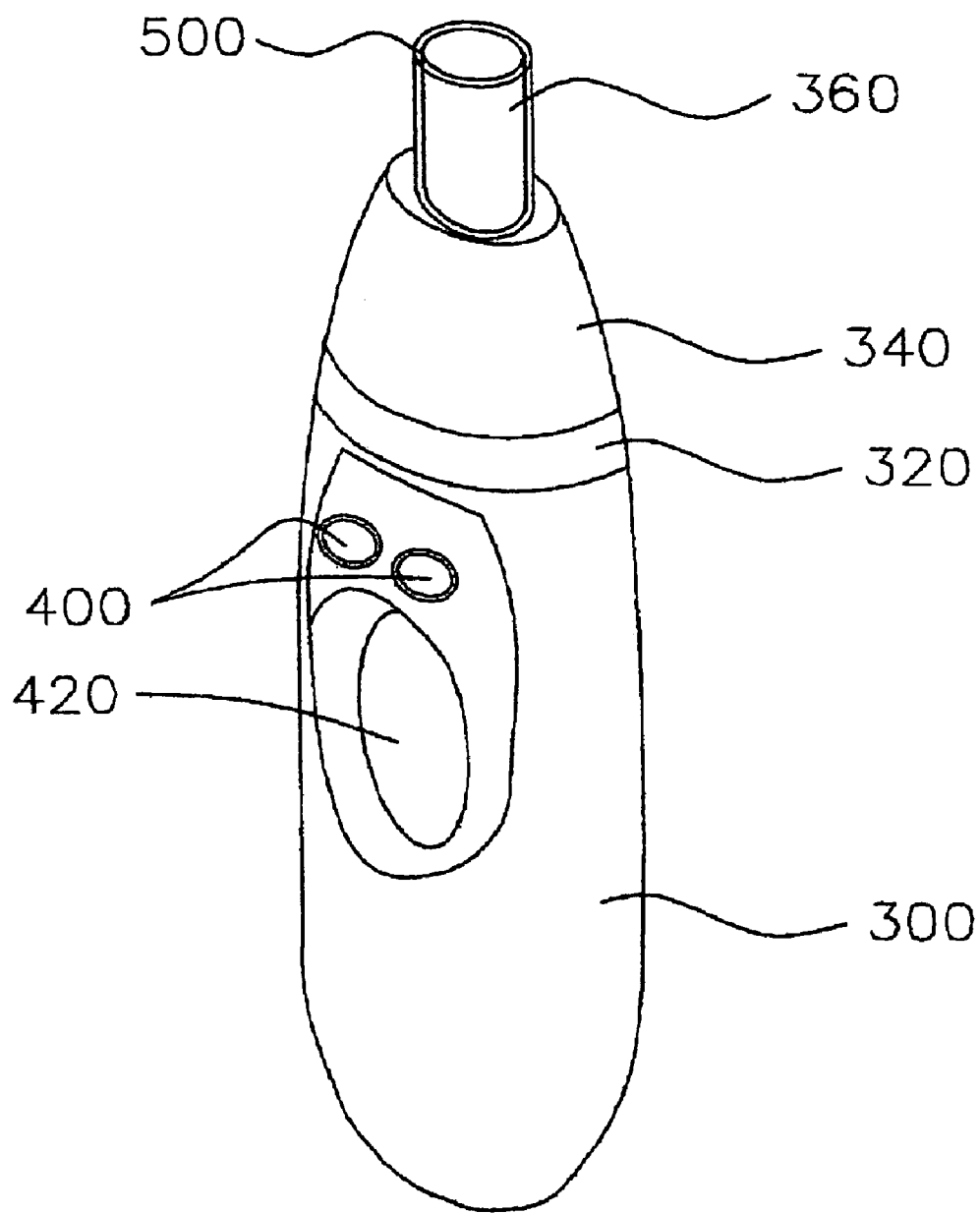
FIG. 5 is a perspective schematic diagram showing an ear thermometer of an embodiment after a rotary control has been rotated along a direction.
Figure 6:
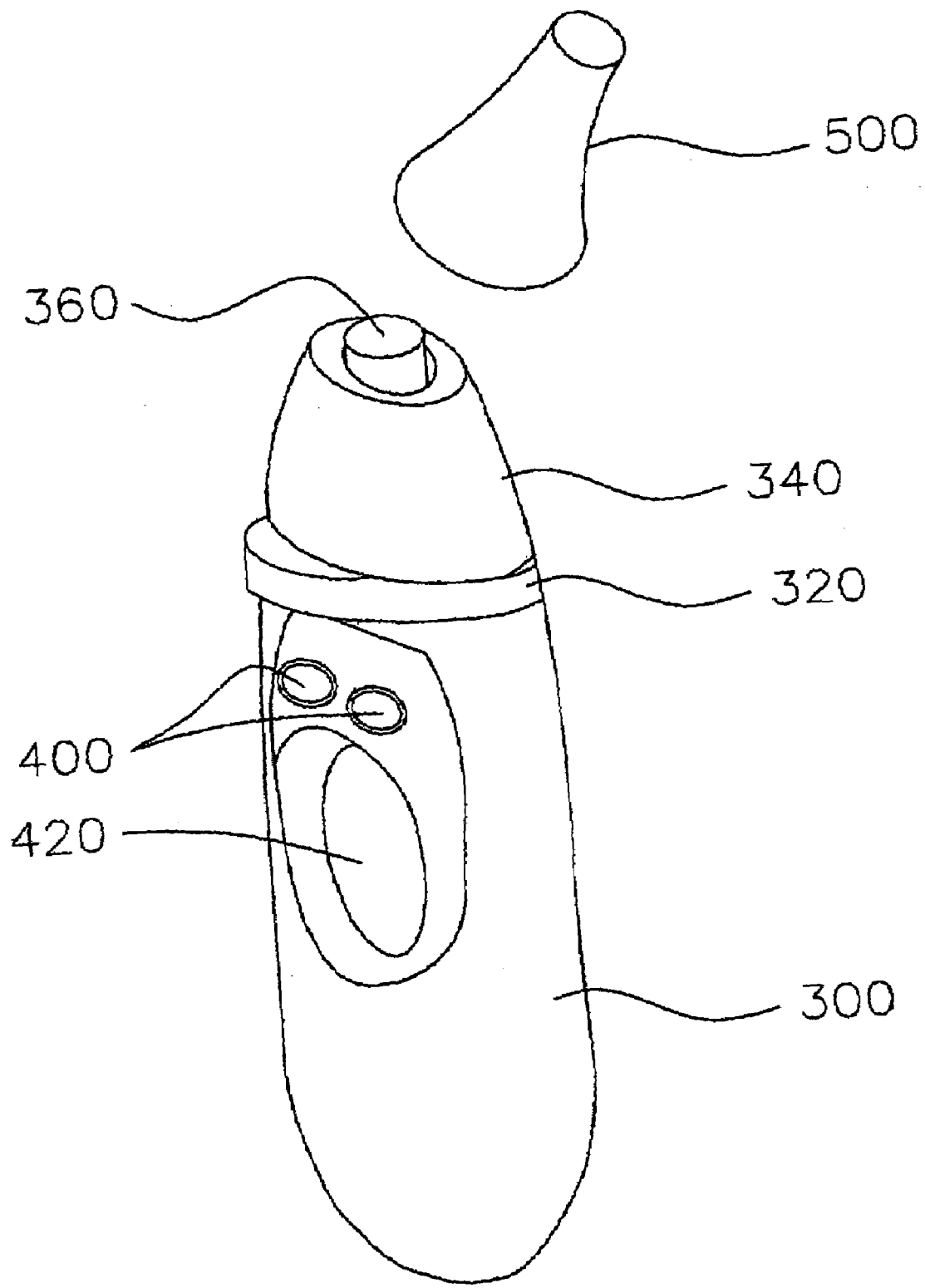
FIG. 6 is a perspective schematic diagram showing an ear thermometer of an embodiment after a probe has been pushed out of a non-detachable cap.

Referring to FIG. 5, a disposable sheath 500 is further surrounds the probe 360 and isolates the probe from contact with the ear canal.

In the above-described embodiments, the probe 360 is preferably operative to be introduced into the chamber and then the disposable sheath 500 may be popped off of the probe 360 by rotating the rotary control 320 along a first direction such as a clockwise direction.

Further, the probe 360 is preferably operative to be pushed out of the hollow cap 340 by rotating the rotary control 320 along a second direction opposite the first direction such as a counterclockwise direction for receiving heat radiation emitted from the ear canal.

Typically, the hollow cap 340 comprises an opening 342 on its top surface and the chamber is extended from the opening 342, thereby allowing the probe 360 to be pushed out of the hollow cap 340 through the opening 342.

In addition, the top surface of the hollow cap 340 may be operative to pop the disposable sheath 500 off of the probe 360.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An ear thermometer for receiving heat radiation emitted from an ear canal, comprising:
   a main body;
   a hollow cap with a chamber therein, secured to the main body;
   a rotary control, disposed between the main body and the hollow cap;
   a threaded sleeve in the chamber, secured to the rotary control; and
   a movable probe, engaging the threaded sleeve;
   wherein a disposable sheath is adapted to cover and isolate the movable probe from contact with the ear canal when the movable probe is pushed out of the chamber by rotating the rotary control in a first direction; and the disposable sheath is popped off of the movable probe when the movable probe is pulled into the chamber by rotating the rotary control in a second direction.

2. The ear thermometer as recited in claim 1, wherein the threaded sleeve comprises an inner thread and the movable probe comprises an outer thread engaging the inner thread.

3. The ear thermometer as recited in claim 1, wherein the hollow cap comprises an opening on its top surface and the chamber extends from the opening, thereby allowing the movable probe to be pushed out of the chamber through the opening.

4. The ear thermometer as recited in claim 3, wherein the top surface of the hollow cap is operative to pop the disposable sheath off of the movable probe.

* * * * *